(12) United States Patent
Park

(10) Patent No.: US 10,259,515 B2
(45) Date of Patent: Apr. 16, 2019

(54) METHOD FOR CONTROLLING A SYSTEM FOR MEASURING A VEHICLE GAP OR STEP

(71) Applicants: Hyundai Motor Company, Seoul (KR); Kia Motors Corporation, Seoul (KR)

(72) Inventor: Sangkyu Park, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/617,348

(22) Filed: Jun. 8, 2017

(65) Prior Publication Data

US 2017/0267300 A1  Sep. 21, 2017

Related U.S. Application Data

(62) Division of application No. 14/140,419, filed on Dec. 24, 2013, now Pat. No. 9,676,432.

(30) Foreign Application Priority Data

Jun. 11, 2013 (KR) .................. 10-2013-0066639

(51) Int. Cl.
*B65D 65/00* (2006.01)
*B62D 65/00* (2006.01)
(Continued)

(52) U.S. Cl.
CPC ............ *B62D 65/005* (2013.01); *B23P 21/00* (2013.01); *G01B 5/14* (2013.01); *Y10T 29/49771* (2015.01); *Y10T 29/53022* (2015.01)

(58) Field of Classification Search
CPC ........ B62D 65/01; B62D 65/12; B62D 65/02; B62D 65/005; B60J 10/00; B23Q 17/22;
(Continued)

(56) References Cited

U.S. PATENT DOCUMENTS 5,513,428 A    5/1996  Shiramizu
5,612,905 A    3/1997  Maillart
(Continued)

FOREIGN PATENT DOCUMENTS

JP      5-26632 A       2/1993
JP      2002-156214 A   5/2002
KR      10-2006-0020206 A  3/2006

*Primary Examiner* — Sarang Afzali
(74) *Attorney, Agent, or Firm* — Morgan, Lewis & Bockius LLP

(57) ABSTRACT

Provided are a system and method for measuring a vehicle gap or step, where a vehicle body to which a hood, a door, and a trunk lid are assembled is seated on a carrier and moved along transfer lines. The system may be installed over the transfer lines and may include one or more door regulating units attached between the vehicle body and the door, upper rails in both sides above a workplace corresponding to the transfer lines, a moving frame movable below the upper rails, a forward/backward moving unit above the moving frame, a horizontal moving unit to move installation frames, a vertical moving unit in the installation frames to reciprocally move a sliding plate upwardly and downwardly, a measurement module movable and rotatable to measure the gap or the step, and an electronic tag on a roof of the vehicle body.

6 Claims, 9 Drawing Sheets

(51) Int. Cl.
*B23P 21/00* (2006.01)
*G01B 5/14* (2006.01)

(58) Field of Classification Search
CPC .......... B61B 10/02; G01B 5/14; G01B 21/16; G01B 11/14; G01B 11/2518; G01B 11/06; G01L 311/14; G01L 311/2518; G01L 311/06; G05B 2219/39084; G05B 2219/40556; G05B 2219/45064; G01M 17/007; B25J 9/16948; B25J 15/0608; B25J 19/0091; B65G 35/08; B65G 2201/0294; B60Y 2300/12; B23P 21/00; B23P 21/02–21/008; B23P 19/00–19/12; Y10T 29/49771; Y10T 29/53022
See application file for complete search history.

(56) References Cited

U.S. PATENT DOCUMENTS

| | | |
|---|---|---|
| 6,549,875 B2 | 4/2003 | Hwang |
| 7,430,813 B2 | 10/2008 | Park |
| 7,484,616 B2 | 2/2009 | Nakamura |

METHOD FOR CONTROLLING A SYSTEM FOR MEASURING A VEHICLE GAP OR STEP

CROSS-REFERENCE TO RELATED APPLICATION

The present application is a divisional of U.S. Pat. No. 9,676,432, filed Dec. 24, 2013, which claims priority of Korean Patent Application Number 10-2013-0066639, filed on Jun. 11, 2013, the entire contents of which applications are incorporated herein for all purposes by these references.

BACKGROUND OF INVENTION

Field of Invention

The present invention relates to a system for measuring a vehicle gap and step and a control method thereof, and more particularly, to a system for measuring a vehicle gap or step capable of eliminating a step in a particular portion of a door of a vehicle body by regulating the door after a hood, a door, and a trunk lid are completely assembled in a vehicle body transfer line and precisely measuring gaps or steps between the vehicle body and respective panels, and a control method thereof.

Description of Related Art

In general, various panels such as a roof, a hood, a door, and a trunk lid, and the like, are installed in a vehicle body to form the exterior of the vehicle body. For example, during a door installation process, a door is installed to be freely rotatable by a door hinge in a vehicle body, rather than being fixed to the vehicle body through a striker, and thereafter, the vehicle body is transferred to a post-process.

In particular, during the post-process that follows the door installation process, in order to measure a gap or a step formed between a vehicle door and a relevant vehicle body portion, a step of the door is eliminated to set a reference position of the door before measuring a gap or a step between the door and a relevant vehicle body portion.

This is because, since the door is assembled to be freely rotatable to the vehicle body through a door hinge, rather than being fixed to the vehicle body through a striker, during the door installation process, it is essential to eliminate a step of a particular door portion during a gap and step measurement process. In this manner, after a step of the door is eliminated, respective panels attached to the vehicle body should be installed not to generate a gap or a step with respect to neighboring panels or the vehicle body, and to this end, conventionally, an operator inspects installation states of various panels through a gauge or only with naked eyes.

However, the manual operation inspection through a gauge or the naked eye inspection method relies on a quality capability determination standard and an operation method of an operator, making it impossible to accurately determine whether various panels have been precisely installed or whether there is an error, and thus, reliability is degraded and it is difficult to manage quality of vehicle bodies uniformly. Thus, in order to solve the problem, recently, an automated vehicle gap/step measurement system is applied through a method of measuring a gap or a step between a vehicle body and various panels by using a robot equipped with a camera, a sensor, or the like.

However, the automated gap/step measurement system employing such a robot has a problem in that a gap or a step of a vehicle body after completing panel assembling is measured within a behavior range, and thus, if a vehicle body is increased in size or when a gap or step not coming within the behavior range of the robot is to be measured, an additional robot should be installed to increase manufacturing costs, installation costs, and the like.

In addition, robots should be individually controlled to correspond to vehicle bodies having different sizes and shapes according to vehicle types, and since there is a limitation in correcting positions of robots, measurement reliability may be degraded.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a system for measuring a vehicle gap or step and a control method thereof having advantages of eliminating a gap or step in a particular portion of a door of a vehicle body by regulating the door after a hood, the door, and a trunk lid are assembled or completely assembled in a vehicle body transfer line and having advantageous of enhancing measurement reliability and productivity by precisely measuring gaps or steps between the vehicle body and the hood, the door, and/or the trunk lid by moving in a forward and backward direction, in an upward and downward direction, and in a width direction of the vehicle body.

The present invention has also been made in an effort to provide a system for measuring a vehicle gap or step and a control method thereof having advantages of reducing an overall cycle time of a process by installing an electronic tag in a roof of a vehicle body and inputting and outputting vehicle type information regarding a vehicle body and details of work through an wireless input/output terminal provided in a system.

Various aspects of the present invention provide a system for measuring a vehicle gap or a step, wherein a vehicle body to which a hood, a door, and a trunk lid are assembled is seated on a carrier and moved along transfer lines, and the system is installed over the transfer lines to measure a gap or step between the vehicle body, the hood, the door, and/or the trunk lid. The system may include: one or more door regulating units configured to place the door installed in the vehicle body such that they are freely rotatable to a reference position and attached between the vehicle body and the door and/or between front and rear doors to eliminate a gap or a step with respect to a pre-set portion of the door; upper rails installed in both sides above a workplace such that they correspond to the transfer lines; a moving frame configured to be movable below the respective upper rails; a forward/backward moving unit installed above the moving frame and moving the moving frame forwardly and backwardly on the upper rails; a horizontal moving unit moving installation frames configured to be substantially perpendicular at both end portions in a length direction of the moving frame to left and right in a width direction of the vehicle body on the moving frame; a vertical moving unit installed in the installation frames and reciprocally moving a sliding plate upwardly and downwardly in a height direction of the vehicle body; a measurement module installed to be movable upwardly and downwardly in the height direction of the vehicle body through the sliding plate of the vertical moving unit and configured to be rotatable on the basis of a forward/backward direction, horizontal direction, and vertical direction of the vehicle body to measure the gap or the step between the vehicle body and the hood, the door, and/or the trunk lid; and an electronic tag installed on a roof of the vehicle body.

The electronic tag may allow an operator to input or output details of work thereto or therefrom through an wireless input/output terminal in real time to check information regarding a vehicle type and work. The wireless input/output terminal may be selectively inserted into or released from a stand provided in one side of the moving frame by the operator.

The door regulating unit may include: a housing having sliding recesses formed at positions spaced apart at a predetermined interval therebetween, one surface thereof corresponding to the door being open; sliders inserted into the sliding recesses and slidably installed therein; a magnetic member installed on front ends of the sliders and generating magnetic force to allow the sliders to be maintained in a state of being attached to the vehicle body and the door; one or more electromagnet members formed to be spaced apart from one another at substantially equal intervals in a length direction within the sliding recesses and selectively generating magnetic force to regulate positions of the sliders; sensors installed on rear ends of the sliders positioned within the sliding recesses and outputting positions of the sliders to a controller; elastic members interposed between the sliders and one surface of the sliding recesses within the sliding recesses and providing elastic force to the sliders; and an operating unit installed on the other surface of the housing and supplying power to the electromagnet members according to whether an operating block is held.

The housing may have a stopping protrusion integrally formed on one open surface of each sliding recess, and a stopping end may be integrally formed in a rear end of the slider such that it corresponds to the stopping protrusion. Each electromagnet member may be configured such that both ends thereof have a same polarity in a length direction of the housing and a portion between the both ends has a different polarity.

The power supply unit may be connected to the controller, and selectively supplies power to each electromagnet member by a control signal from the controller according to whether the operating unit operates, to regulate a position of each slider.

The measurement module may include: a first rotary motor installed in the sliding plate through a connection frame such that a rotational shaft thereof faces downwardly, and rotated on the basis of the vertical direction of the vehicle body; an installation bracket installed in the rotational shaft of the first rotary motor; a second rotary motor installed in one side of the installation bracket and having a rotational shaft passing through the installation bracket and rotated on the basis of the forward/backward direction of the vehicle body; a third rotary motor connected to the rotational shaft of the second rotary motor within the installation bracket, and having a rotational shaft rotated on the basis of the horizontal direction corresponding to the width direction of the vehicle body; and a sensor connected to the rotational shaft of the third rotary motor and measuring the gap or the step between the vehicle body and the hood, the door, and/or the trunk lid.

The sensor may include a vision sensor, and may output a sensed measurement value to the controller. The first, second, and third rotary motors may be electrically connected to the controller, and may include servo motors whose RPMs and rotational directions can be regulated.

The forward/backward moving unit may include: a connection plate installed above the moving frame corresponding to the upper rails; one or more rollers installed on one surface of the connection plate such that they are rollingly in contact with inner upper and lower surfaces of the upper rails; and a first driving motor installed on the other surface of the connection plate in a state in which a rotational shaft thereof is connected to a roller in contact with the inner upper surface of each upper rail, among the respective rollers, and transferring driving force to the roller.

The horizontal moving unit may include: a connection housing connected to an upper end of each installation frame, and installed on upper portions of both ends of the moving frames; rack gears installed on both upper portions of the moving frames in a length direction; pinion gears enmeshed with the respective rack gears within the connection housing; a rotational shaft connected to a rotational center of each pinion gear; and a second driving motor having a rotational shaft connected to the rotational shaft and installed in the connection housing to transfer rotary power to the rotational shaft.

The vertical moving unit may include: a rail housing installed in the installation frame in the vertical direction of the vehicle body and having a sliding plate slidably coupled to one surface thereof facing a front side of the vehicle body; a third driving motor installed within the rail housing and having a rotational shaft connected to a ball screw; a guide rail mounted on a plate within the rail housing; and a rail block inserted into the ball screw and installed to be reciprocally movable along the guide rail on the ball screw according to an operation of the third driving motor, and connected to the sliding plate.

Various other aspects of the present invention provide a method for controlling a system for measuring a vehicle gap or a step, wherein a vehicle body to which a hood, a door, and a trunk lid are assembled is seated on a carrier and moved along transfer lines, and the system is installed over the transfer lines to measure a gap or step between the vehicle body, the hood, the door, and/or the trunk lid. The method may include (a) when the vehicle body enters along the transfer lines, recognizing a vehicle type of the vehicle body based on information transmitted to a controller and information transmitted from an electronic tag to an wireless input/output terminal and eliminating a gap or step with respect to a pre-set portion of the door through a door regulating unit; (b) determining whether a measurement position of the gap or step between the vehicle body and the hood, the door, and/or the trunk lid has been checked while a forward/backward moving unit, a horizontal moving unit, a vertical moving unit, and a measurement module are on standby; (c) arranging for operations of the respective moving units and the measurement module according to the checked state of the gap or step measurement position of the vehicle body, measuring the gap or the step between the vehicle body and the hood, the door, and/or the trunk lid, and determining whether the measurement value is substantially identical to a pre-set value inputted to the controller; and (d) inputting, by an operator, the gap or step measurement value of the vehicle body to an electronic tag attached to the vehicle body through the wireless input/output terminal, selectively transferring the vehicle body according to the measurement value, and terminating the control.

The operation (a) may include: allowing the vehicle body seated on the carrier to enter along the transfer lines; recognizing the vehicle type of the vehicle body through information received by the controller; and placing the door having the door regulating unit attached thereto and installed to be freely rotatable in the vehicle body in a reference position as a home position, and eliminating the gap or step with respect to a pre-set portion of the door.

The operation (b) may include: setting the respective moving units and the measurement module on standby; determining by the controller whether the gap or step measurement position between the vehicle body and the hood, the door, and/or the trunk lid has been checked; and when the gap or step measurement position of the vehicle body has not been checked, returning to the setting of the respective moving units and the measurement module on standby.

The operation (c) may include: when the checking of the gap or step measurement position of the vehicle body is completed, arranging for operations of the respective moving units and the measurement module; moving the respective moving units along the vehicle body according to the gap or step measurement position of the vehicle body to move the measurement module, and measuring the gap or step of the vehicle body through operations of respective rotary motors and a sensor; and comparing the gap or step measurement value between the vehicle body and the hood, the door, and/or the trunk lid measured by the measurement module with the pre-set value inputted to the controller to determine whether it is normal.

The sensor may include a vision sensor and output the sensed measurement value to the controller.

The operation (d) may include: when the gap or step measurement value between the vehicle body and the hood, the door, and/or the trunk lid measured through the measurement module is not substantially identical to the pre-set value, determining that the vehicle body is defective, inputting, by the operator, the measurement value to the electronic tag through the wireless input/output terminal, transferring the vehicle body as rejected goods, and terminating the control; and when the gap or step measurement value between the vehicle body and the hood, the door, and/or the trunk lid measured through the measurement module is substantially identical to the pre-set value, determining that the vehicle body is qualified, inputting, by the operator, the measurement value to the electronic tag through the wireless input/output terminal, transferring the vehicle body as passed goods, and terminating the control.

As described above, in the case of the system for measuring a vehicle gap or step and the control method thereof according to various aspects of the present invention, since the system for measuring a vehicle gap or step is configured to be movable forwardly/backwardly, vertically, and in a width direction of the vehicle body, a gap or step between the vehicle body and the hood, the door, and the trunk lid can be precisely measured, enhancing measurement reliability, and since an installation of a plurality of measurement robots is eliminated, manufacturing costs and installation costs can be reduced.

Also, by eliminating a step of a particular portion of the door installed to be freely rotatable in the vehicle body through the door regulating unit that places the door in a reference position as a home position, a regulating device separately installed in a process line to regulate a position of the door in the related art can be removed, reducing costs, and since accuracy of elimination of a door step is enhanced, gap or step measurement accuracy and a processing speed can be enhanced.

Also, since the electronic tag is installed on the roof of the vehicle body to input and output information regarding a vehicle type and details of work through the wireless input/output terminal provided in the system, an overall cycle time of the process can be reduced.

In addition, the system for measuring a vehicle gap or step can be commonly applied to multiple vehicle types, and since a gap or step measurement is automatically performed according to a vehicle type, a gap or step measurement time can be shortened, enhancing productivity.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
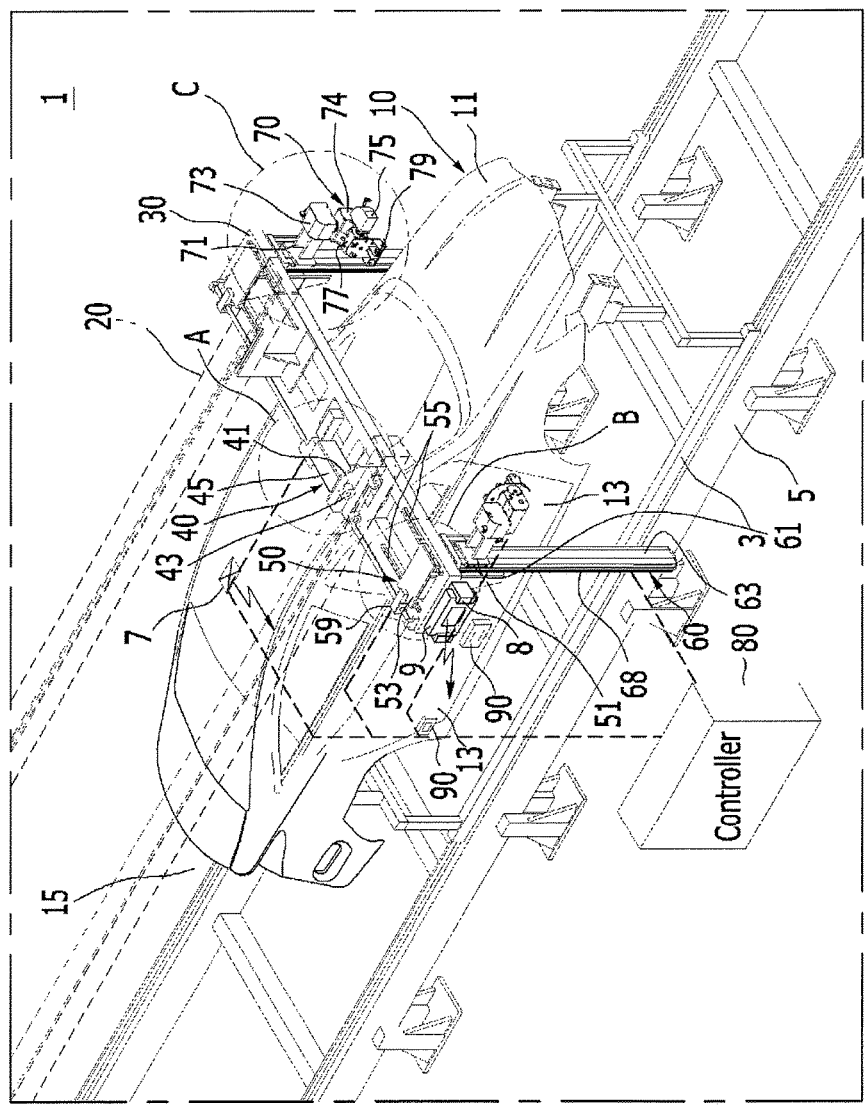
FIG. 1 is a perspective view of an exemplary system for measuring a vehicle gap or step according to the present invention.
Figure 2:
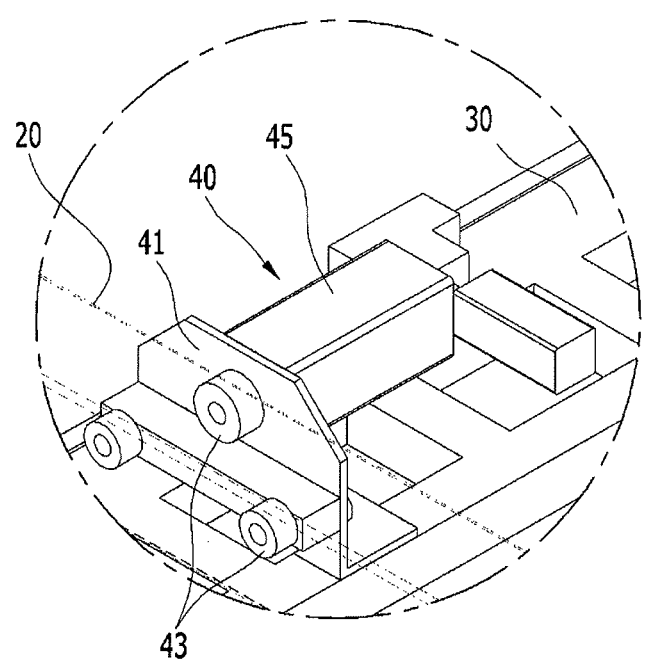
FIG. 2 is an enlarged perspective view of a portion 'A' of FIG. 1.
Figure 3:
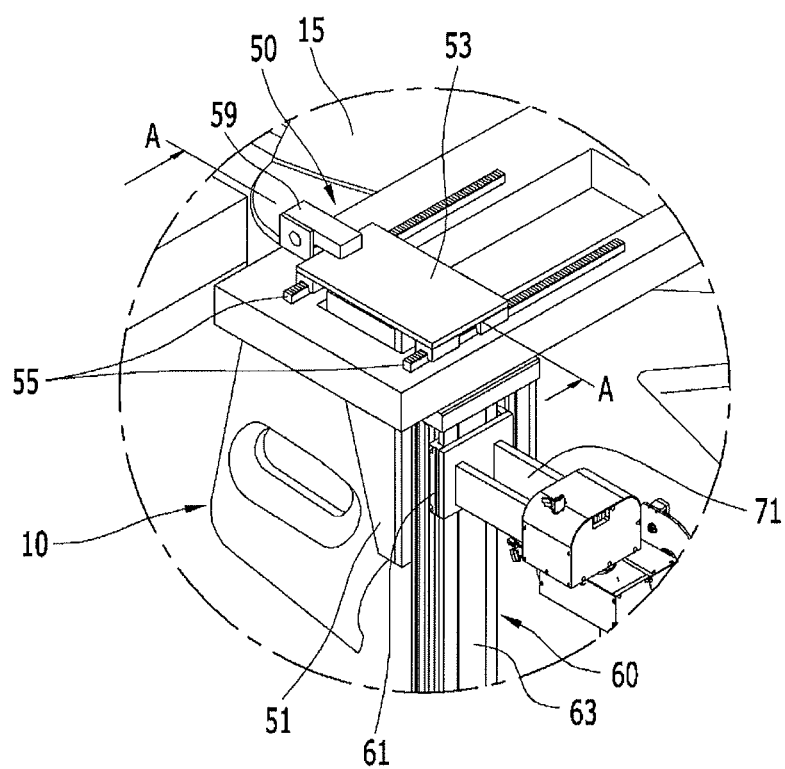
FIG. 3 is an enlarged perspective view of a portion 'B' of FIG. 1.
Figure 4:
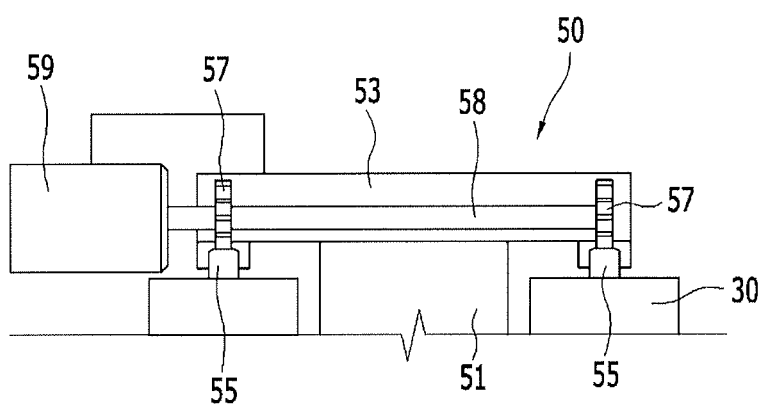
FIG. 4 is a cross-sectional view taken along line A-A of FIG. 3.
Figure 5:
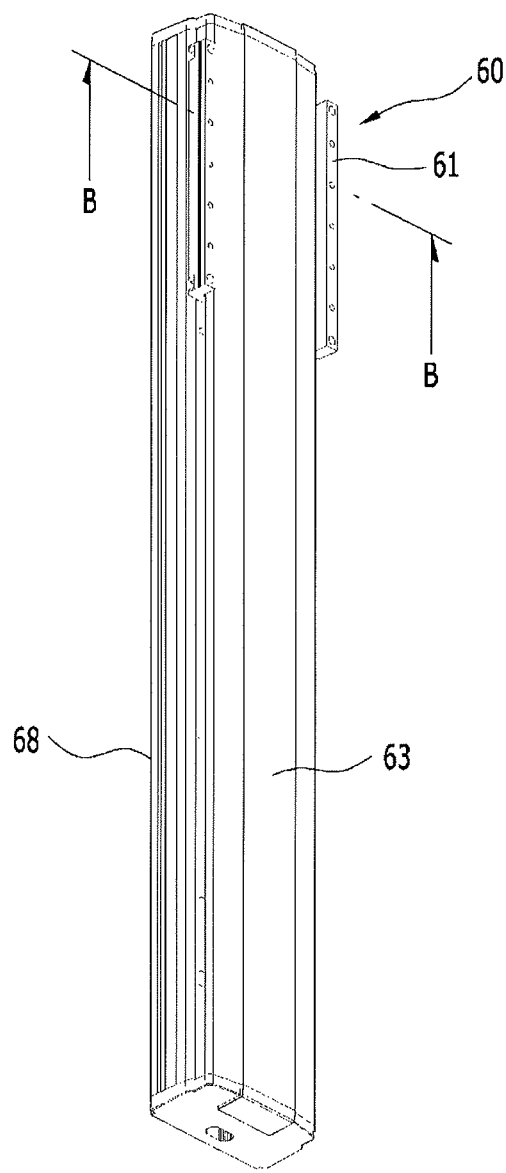
FIG. 5 is a perspective view of an exemplary vertical movement unit applied to a system for measuring a vehicle gap or step according to the present invention.
Figure 6:
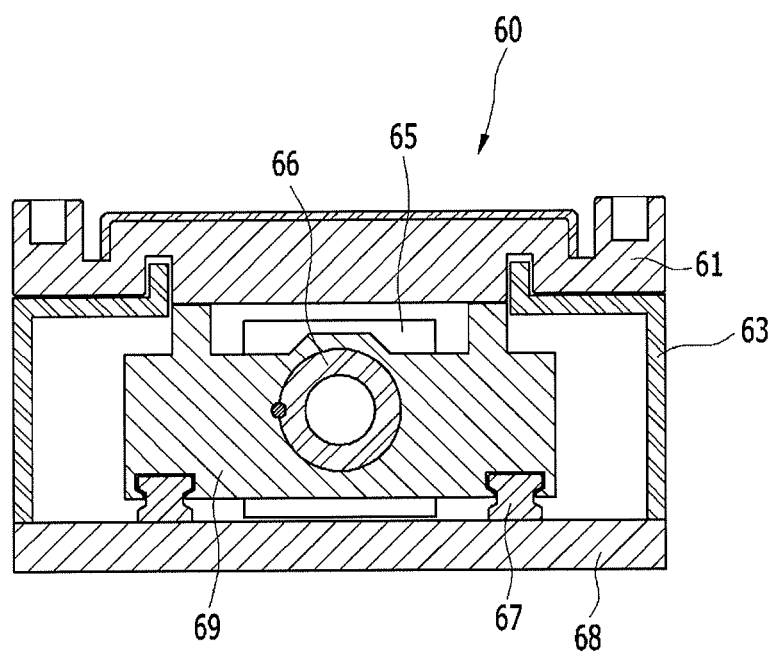
FIG. 6 is a cross-sectional view taken along line B-B of FIG. 5.
Figure 7:
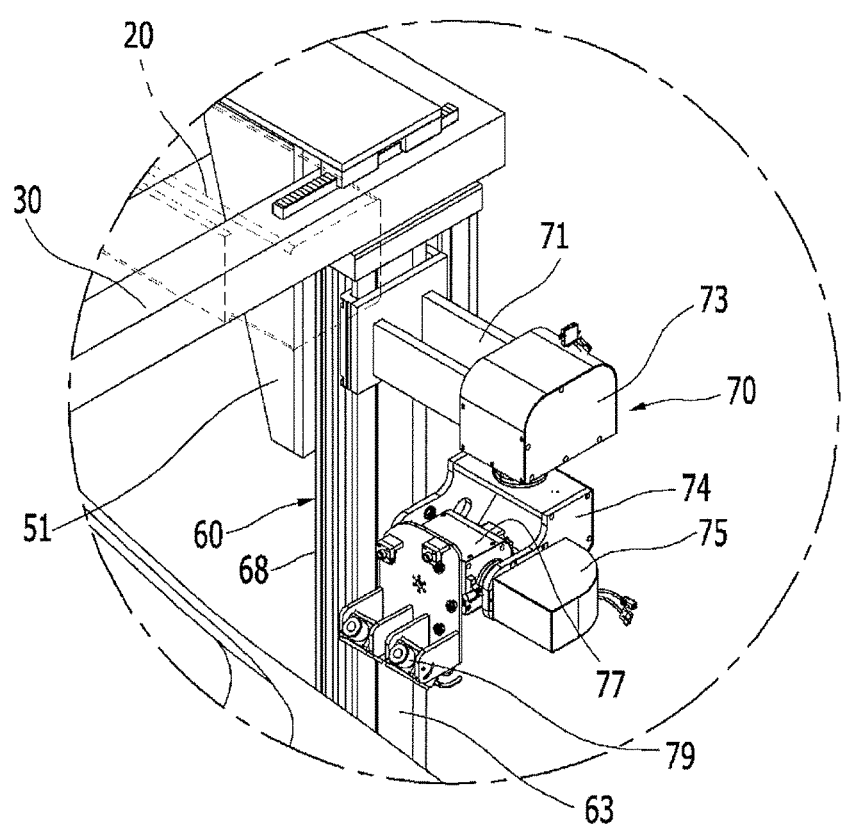
FIG. 7 is an enlarged perspective view of a portion 'C' of FIG. 1.
Figure 8:
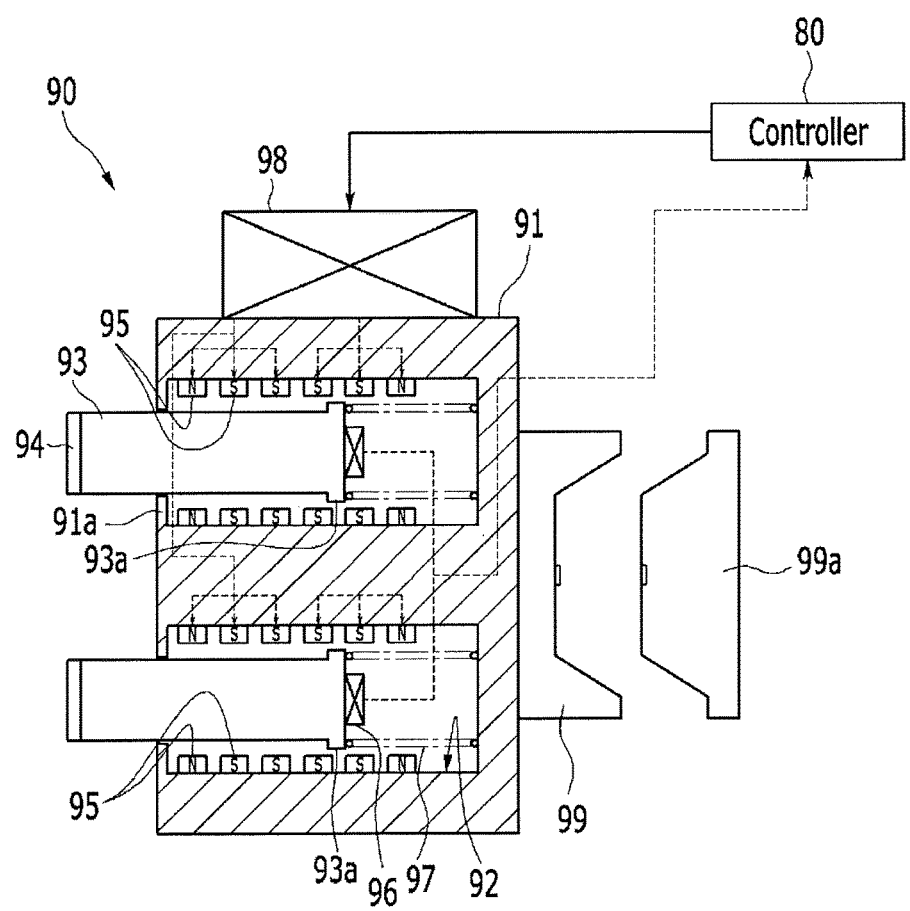
FIG. 8 is a cross-sectional view of an exemplary door regulating unit applied to a system for measuring a vehicle gap or step according to the present invention.

FIG. 1 is a perspective view of a system for measuring a vehicle gap or step according to various embodiments of the present invention. FIG. 2 is an enlarged perspective view of a portion 'A' of FIG. 1. FIG. 3 is an enlarged perspective view of a portion 'B' of FIG. 1. FIG. 4 is a cross-sectional view taken along line A-A of FIG. 3. FIG. 5 is a perspective view of a vertical movement unit applied to the system for measuring a vehicle gap or step according to various embodiments of the present invention. FIG. 6 is a cross-sectional view taken along line B-B of FIG. 5. FIG. 7 is an enlarged perspective view of a portion 'C' of FIG. 1. FIG. 8 is a cross-sectional view of a door regulating unit applied to the system for measuring a vehicle gap or step according to various embodiments of the present invention.

Referring to FIGS. 1 through 8, a system 1 for measuring a vehicle gap or step according to various embodiments of the present invention eliminates a step in a particular portion of a door 13 of a vehicle body 10 by regulating the door 13 after a hood 11, the door 13, and a trunk lid 15 are completely assembled in a vehicle body transfer line 5 and enhances measurement reliability and productivity by automatically precisely measuring gaps or steps between the vehicle body 10 and the hood 11, the door 13, and the trunk lid 15 by moving in a forward and backward direction, in an upward and downward direction, and in a width direction of the vehicle body 10. The system 1 for measuring a vehicle gap or step according to various embodiments of the present invention may be commonly applied to a plurality of vehicle types.

In addition, the system 1 for measuring a vehicle gap or step according to various embodiments of the present invention has a structure in which an electronic tag 7 is installed on a roof of the vehicle body 10 transferred on the transfer line 5 of the vehicle body to allow vehicle type information regarding the vehicle body 10 and details of work to be input thereto or output therefrom in real time through the wireless input/output terminal 9, thus reducing an overall cycle time of the process.

To this end, as illustrated in FIG. 1, in the system 1 for measuring a vehicle gap or step according to various embodiments of the present invention, the vehicle body 10 with the hood 11, the door 13, and the trunk lid 15 completely assembled therein is seated on a carrier 3 moving along the transfer line 5, and installed on the transfer line 5 of the vehicle body 10.

The system 1 for measuring a vehicle gap or step according to various embodiments of the present invention includes an upper rail 20, a moving frame 30, a forward/backward moving unit 40, a horizontal moving unit 50, a vertical moving unit 60, a measurement module 70, and a door regulating unit 90. In order to measure a gap or a step of the vehicle body 10, the system 1 for measuring a vehicle gap or step places the door 13 installed to be freely rotatable in the vehicle body 10 in a reference position as a home position when the vehicle body 10 moves or stops, and eliminates a step of a particular portion of the door 13.

Here, the vehicle body 10 may include the electronic tag 7 installed on a roof and communicating with the wireless input/output terminal 9 to allow an operator to check information regarding a vehicle type and work by inputting and outputting details of work in real time through the wireless input/output terminal 9. The wireless input/output terminal 9 is configured to be selectively inserted into or removed from a stand (or a rack) provided at one side of the moving frame 30 by the operator.

First, the upper rails 20 are installed in both upper sides of the operator such that the upper rails 20 correspond to the transfer lines 5. In some embodiments, the moving frame 30 is configured to be movable below the respective upper rails.

The forward/backward moving unit 40 is installed above the moving frame 30 and moves the moving frame 30 on the upper rails 20 forwardly and backwardly. Here, as illustrated in FIG. 2, the forward/backward moving unit 40 includes a connection plate 41, a plurality of rollers 43, and a first driving motor 45.

First, the connection plate 41 is installed above the moving frame 30 corresponding to the upper rails 20. A plurality of rollers, such as three rollers 43, are provided, and among the rollers 43, one roller 43 is installed in an upper portion of one surface of the connection plate 41 and the other two rollers 43 are installed in both sides of a lower portion of the connection plate 41 such that they are rollingly in contact with the inner upper and lower surfaces of the upper rails 20.

The first driving motor 45 is installed on the other surface of the connection plate 41 in a state in which a rotational shaft of the first driving motor 45 is connected to the roller 43 in contact with an inner upper surface of each upper rail 20, among the respective rollers 43. The first driving motor 45 transfers driving force to the roller 43 to move each moving frame 30 on the upper rails 20. Here, the first driving motor 45 may be configured to include a servo motor whose revolution per minute (RPM) and rotational direction can be regulated.

In some embodiments, as illustrated in FIGS. 3 and 4, the horizontal moving unit 50 moves installation frames 51 configured to be perpendicular or substantially perpendicular to both end portions of each moving frame 30 in a length direction to the left and right in a width direction of the vehicle body 10 on each moving frame 30. The horizontal moving unit 50 includes a connection housing 53, a rack gear 55, a pinion gear 57, a rotational shaft 58, and a second driving motor 59.

First, the connection housing 53 is connected to an upper end of each installation frame 51, and slidably installed on upper portions of both ends of the moving frames 30. In some embodiments, the rack gears 55 are installed on both upper portions of the moving frames 30 in a length direction. The pinion gears 57 are enmeshed with the respective rack gears 55 within the connection housing 53, and the rotational shaft 58 is connected to a rotational center of each pinion gear 57.

The second driving motor 59 has a rotational shaft connected to the rotational shaft 58, and is installed in the connection housing 53 to transfer rotary power to the rotational shaft 58. Here, the second driving motor 59 may be configured to include a servo motor whose RPM and rotational direction can be regulated.

The horizontal moving unit 50 configured as described above moves the installation frame 51 to the left or right in the width direction of the vehicle body such that it corresponds to a width of the vehicle body 10 which varies according to each vehicle type. Namely, in the horizontal moving unit 50, when the second driving motor 59 is rotated in a forward/backward direction, each pinion gear 57 is rotated in mesh with the rack gear 55 upon receiving rotary power of the second driving motor 2 through the rotational shaft 58, thus moving the installation frame 51 connected to the connection housing 53 to the left or right from both ends of the moving frame 30.

In some embodiments, the vertical moving unit 60 is installed through the installation frame 51, and reciprocally moves a sliding plate 61 upwardly and downwardly in a height direction of the vehicle body 10. As illustrated in FIGS. 5 and 6, the vertical moving unit 60 includes a rail housing 63, a third driving motor 65, a guide rail 67, and a rail block 69.

First, the rail housing 63 is installed in the installation frame 51 in a vertical direction of the vehicle body 10, and a sliding plate 61 is slidably coupled to one surface of the rail housing 63 facing a front side of the vehicle body 10. The third driving motor 65 is installed within the rail housing 63, and a rotational shaft thereof is connected to a ball screw 66. The third driving motor 65 may be configured to include a servo motor whose RPM and rotational direction may be regulated.

In some embodiments, the guide rail 67 is mounted on a plate 68 within the rail housing 63. The rail block 69 is inserted into the ball screw 66 and installed to be reciprocally movable along the guide rail 67 on the ball screw 66 according to an operation of the third driving motor 65. The rail block 69 is connected to the sliding plate 61. Namely, in each vertical moving unit 60 configured as described above, when the third driving motor 65 is rotated in a forward direction or backward direction, the rail block 69 is moved on the ball screw 66 along the guide rail 67.

Then, the sliding plate 61 connected to the rail block 69 is reciprocally slidably moved upwardly and downwardly in a length direction of the rail housing 63 on the basis of a height direction of the vehicle body 10 within the rail housing 63.

Meanwhile, in some embodiments, the first, second, and third driving motors 45, 59, and 65 configured in the forward/backward moving unit 40, the horizontal moving unit 50, and the vertical moving unit 60, respectively, are electrically connected to a controller 80, and may be rotated in a forward direction and backward direction according to a control signal from the controller 80, respectively.

Also, in some embodiments, the measurement module 70 is installed to be movable upwardly and downwardly in the height direction of the vehicle body 10 through the sliding plate 61 of the vertical moving unit 60 and configured to be rotatable on the basis of the forward/backward direction, horizontal direction, and vertical direction of the vehicle body 10 to measure a gap or a step between the vehicle body 10 and the hood 11, the door 13, and the trunk lid 15.

As illustrated in FIG. 7, the measurement module 70 includes a first rotary motor 73, an installation bracket 74, second and third rotary motors 75 and 77, and a sensor 79. First, the first rotary motor 73 is installed in the sliding plate 61 through a connection frame 71 such that a rotational shaft thereof faces downwardly, and is rotated on the basis of the vertical direction of the vehicle body 10. The installation bracket 74 is installed in the rotational shaft of the first rotary motor 73 and rotated together with the rotational shaft of the first rotary motor 73 on the basis of the vertical direction of the vehicle body 10 according to an operation of the first rotary motor 73.

In some embodiments, the second rotary motor 75 is installed in one side of the installation bracket 74, and a rotational shaft thereof is rotated, passing through the installation bracket 74, on the basis of a forward/backward direction of the vehicle body 10. The third rotary motor 77 is connected to the rotational shaft of the second rotary motor 75 within the installation bracket 74, and a rotational shaft thereof is rotated on the basis of a horizontal direction as a width direction of the vehicle body 10.

Here, the first, second, and third rotary motors 73, 75, and 77 are electrically connected to the controller 80, and may be configured to include servo motors whose RPM and rotational direction can be regulated.

The sensor 79 is connected to the rotational shaft of the third rotary motor 77 and measures a gap or a step between the vehicle body 10 and the hood 11, the door 13, and the trunk lid 15. Here, the sensor 79 may be configured as a vision sensor, and outputs a sensed measurement value to the controller 80.

In measuring a gap or a step between the vehicle body 10 and the hood 11, the door 13, and the trunk lid 15, the measurement module 70 configured as described above may accurately measure a gap or a step even in a curved portion or a slanted portion of the vehicle body 10 through the first, second, and third rotary motors 73, 75, and 77 operated according to a control signal from the controller 80.

As illustrated in FIG. 8, one or more door regulating units 90 may be provided, and places the door 13 installed to be freely rotatable in the vehicle body 10, in a reference position as a home position. At the same time, the door regulating unit 90 is attached between the vehicle body 10 and the door 13 and between a front door 13 and a rear door 13 in order to eliminate a step in a pre-set portion of the door 13.

The door regulating unit 90 includes a housing 91, a slider 93, a magnetic member 94, an electromagnet member 95, a sensor 96, an elastic member 97, and an operating unit 99. First, the housing 91 has sliding recesses 92 formed at positions spaced apart at a predetermined interval therebetween within the housing 91, one surface thereof corresponding to the door 10 being open. The sliders 93 are installed to be inserted into the sliding recesses 92 and slidably moved therein.

Here, the housing 91 has a stopping protrusion 91a integrally formed on one open surface of each sliding recess 92, and a stopping end 93a may be integrally formed in a rear end of the slider 92 such that it corresponds to the stopping protrusion 91a. One will appreciate that such integral components may be monolithically formed.

In some embodiments, the magnetic member 94 is installed in a front end of the slider 93, and generates magnetic force to allow the slider 93 to be maintained in a state of being attached to the vehicle body 10 and the door 13.

A plurality of electromagnet members 95 are formed to be spaced apart from one another at equal or substantially equal intervals in a length direction within the sliding recess 92. The electromagnet members 92 generate magnetic force selectively to regulate a position of the slider 95. Here, each electromagnet member 95 is configured such that both ends thereof have the same polarity in a length direction of the housing 91 and a portion between the both ends has different polarity.

In some embodiments, the sensor 96 is installed in a rear end of the slider 93 positioned within the sliding recess 92 and outputs a position of the slider 93 to the controller 80. The elastic member 97 is interposed between the slider 93 and one side of the sliding recess 92 within the sliding recess 92, and provides elastic force to the slider 93.

Namely, when the slider 93 moves forward or backward within the sliding recess 92 by electromagnetic force generated by the electromagnet member 95, the elastic member 97 provides elastic force to the slider 93 to eliminate a step with respect to a pre-set portion of the door 13. Also, when the generation of the electromagnetic force is stopped as the attached door regulating unit 90 is released, the elastic member 97 returns the slider 93 to its initial position.

The operating unit 99 is installed on the other surface of the housing 91, and operates a power supply unit 98 supplying power to the electromagnet member 95 according to whether an operating block 99a is held thereto. Here, the power supply unit 98 may be connected to the controller 80 and selectively supply power to each electromagnet member 95 by a control signal from the controller 80 according to whether the operating unit 99 operates, to regulate a position of each slider 93.

Hereinafter, an operation of the system for measuring a vehicle gap or step configured as described above and a control method thereof according to various embodiments of the present invention will be described.

Figure 9:
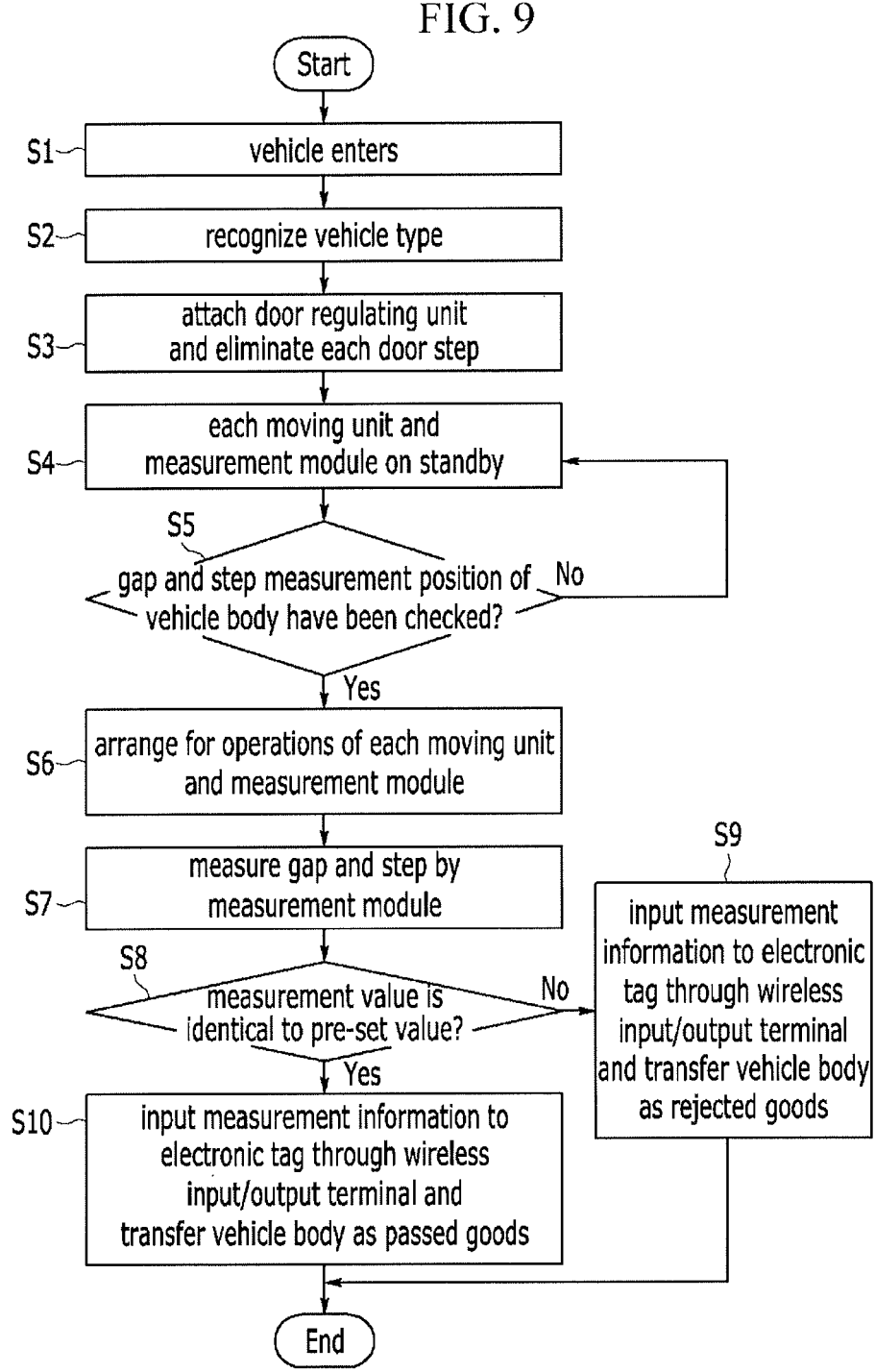
FIG. 9 is a flow chart illustrating an exemplary method for controlling a system for measuring a vehicle gap or step according to the present invention.

FIG. 9 is a flow chart illustrating a method for controlling a system for measuring a vehicle gap or step according to various embodiments of the present invention. Referring to FIG. 9, a method for controlling a system for measuring a vehicle gap or step according to various embodiments of the present invention is applied to measure a gap or a step between the vehicle body 10 and the hood 11, the door 13, and the trunk lid 15 by using the forward/backward moving unit 40, the horizontal moving unit 50, the vertical moving unit 60, the measurement module 70, and the door regulating unit 90 installed on the transfer line 5 through the moving frame 30 and the installation frame 51 as described above.

The method for controlling the system for measuring a vehicle gap or step includes (a) when the assembling-completed vehicle body 10 seated in the carrier 3 enters along the transfer line 5, recognizing a vehicle type of the vehicle body 10 from information transmitted to the controller 80 and information transmitted from the electronic tag 7 to the wireless input/output terminal 9 and eliminating a step with respect to a pre-set portion of the door 13 through the door regulating unit 90, and (b) determining whether a measurement position of a gap or a step between the vehicle body 10 and the hood 11, the door 13, and the trunk lid 15 has been checked while the forward/backward moving unit 40, the horizontal moving unit 50, the vertical moving unit 60, and the measurement module 70 are on standby.

Also, the method for controlling the system for measuring a vehicle gap or step includes (c) arranging for operations of respective moving units 40, 50, and 60, and the measurement module 70 according to the checking of the measurement position of a gap or a step in the vehicle body 10 determined in step (b), measuring a gap or a step between the vehicle 10 and the hood 11, the door 13, and the trunk lid 15, and determining whether a measurement value is equal to a pre-set value input to the controller 80, and (d) inputting, by an operator, the measurement value of a gap or a step in the vehicle body 10 determined in the foregoing process to the electronic tag 7 attached to the vehicle body 10 through the wireless input/output terminal 9, selectively transferring the vehicle body 10 according to the measurement value, and terminating the controlling.

First, when the vehicle body 10, in a state in which the hood 11, the door 13, and the trunk lid 15 are assembled, is seated on the carrier 3 and enters along the transfer line 5 (S1), a vehicle type of the vehicle body 10 is recognized through information received by the controller 80 and the wireless input/output terminal 9 from the electronic tag 7 (S2), the door 13 installed to be freely rotatable in the vehicle body 10 is placed in a reference position as a home position thereof through the door regulating unit 90, and a step with respect to a pre-set portion of the door 13 is eliminated (S3).

Here, each slider 93 of the door regulating unit 90 is attached between the respective doors 13 or between the vehicle body 10 and the door 13, and when the operating block 99a is held to the operating unit 99 and operated, the power supply unit 98 controlled by the controller 80 applies power to each electromagnet member 95 to generate electromagnetic force to move forward or backward each slider 93.

In this case, the sensor 96 outputs a position of each slider 93 to the controller 80, and the controller 80 controls power application to the electromagnet member 95 according to a signal output from the sensor 96. The elastic member 97 provides elastic force to each slider 93 to eliminate a step of the door 13.

Thereafter, the respective moving units 40, 50, and 60 and the measurement module 70 are set to be on standby (S4), and the controller 80 determines whether a measurement position of a gap or a step between the vehicle body 10 and the hood 11, the door 13, and the trunk lid 15 has been checked (S5).

When the controller 80 determines that a measurement position of a gap or a step has not been checked (namely, when the condition is not met), the process is returned to step (S4) of setting the respective moving units 40, 50, and 60 and the measurement module 70 to be on standby again and the foregoing process is repeatedly performed to determine whether a measurement position of a gap or a step has been checked.

Meanwhile, when the controller 80 determines that a measurement position of a gap or a step of the vehicle body 10 has been checked (namely, when the condition is met), the controller 180 arranges for operations of the respective moving units 40, 50, and 60, and the measurement module 70 (S6).

Thereafter, the controller 80 outputs a control signal to control the first, second, and third driving motors 45, 59, and 65 of the forward/backward moving unit 40, the horizontal moving unit 50, and the vertical moving unit 60 to enable the respective moving units 40, 50, and 60 move the measurement module 70 to the gap or step measurement portion of the vehicle body 10 according to a gap or step measurement position of the vehicle body 10, and the respective rotary motors 73, 75, and 77 and the sensor 79 configured in the measurement module 70 are operated to measure a gap or a step of the vehicle body (S7).

Here, in order to precisely measure a gap or step although a gap or step measurement position is bent or sloped, the respective rotary motors 73, 75, and 77 provided in the measurement module 70 rotate the sensor 79 in the forward/backward direction, the horizontal direction, and the vertical direction on the basis of the vehicle body to move the position. The sensor 79 may be configured to include a vision sensor and outputs a sensed measurement value to the controller 80.

Upon receiving the gap or step measurement value between the vehicle body 10 and the hood 11, the door 13, and the trunk lid 15 measured by the measurement module 70 from the sensor 79, the controller 80 compares the gap or step measurement value with a pre-set value which was input to the controller 80 to determine whether it is normal (S8).

When the controller 80 determines that the gap or step measurement value between the vehicle body 10 and the hood 11, the door 13, and the trunk lid 15 measured by the measurement module 70 is not equal to the pre-set value, the controller 80 determines that the vehicle body 10 is defective. In this case, the operator takes the wireless input/output terminal 9 out of the stand 8 and inputs the gap or step measurement value measured by the measurement module 70 to the electronic tag 7 by using the wireless input/output terminal 9.

When the inputting of the gap or step measurement value to the electronic tag 7 is completed, the controller 80 transfer the vehicle body 10 as rejected goods and terminates the control (S9), and repeatedly performs the foregoing steps to continuously measure a gap or step of the vehicle body 10 required to be measured.

Meanwhile, when it is determined that the gap or step measurement value between the vehicle body 10 and the hood 11, the door 13, and the trunk lid 15 measured by the measurement module 70 is equal to the pre-set value, the controller 10 determines that the vehicle body 10 is qualified.

In this case, as described above, the operator takes the wireless input/output terminal 9 from the stand 8 and inputs the gap or step measurement value measured through the measurement module 70 to the electronic tag 7 by using the wireless input/output terminal 9. Thereafter, the controller 80 transfers the vehicle body 10 as passed goods and terminates the control (S10).

Namely, according to the method for controlling a system for measuring a vehicle gap or step according to various embodiments of the present invention, a gap or step of the vehicle 10 mounted on the carrier 3 after assembling is completed is measured by repeatedly performing the processes and steps as described above.

Thus, when the system 1 for measuring a vehicle gap or step configured as described above and the control method thereof according to various embodiments of the present invention are applied, since the system 1 for measuring a vehicle gap or step is configured to be movable forwardly/backwardly, vertically, and in a width direction of the vehicle body 10, a gap or step between the vehicle body 10 and the hood 11, the door 13, and the trunk lid 15 can be precisely measured, enhancing measurement reliability, and since an installation of a plurality of measurement robots is eliminated, manufacturing costs and installation costs can be reduced.

Also, by eliminating a step of a particular portion of the door 13 installed to be freely rotatable in the vehicle body 10 through the door regulating unit 90 that places the door in a reference position as a home position, a regulating device separately installed in a process line to regulate a position of the door in the related art can be removed, reducing costs, and since accuracy of elimination of a door step is enhanced, gap or step measurement accuracy and a processing speed can be enhanced.

Also, since the electronic tag 7 is installed on the roof of the vehicle body 10 to input and output information regarding a vehicle type and details of work through the wireless input/output terminal 9 provided in the system, an overall cycle time of the process can be reduced.

In addition, the system for measuring a vehicle gap or step can be commonly applied to multiple vehicle types, and since a gap or step measurement is automatically performed without a halt of the transferred vehicle body 10, a measurement time can be shortened, enhancing productivity.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For convenience in explanation and accurate definition in the appended claims, the terms "upper" or "lower", "front" or "rear", "left" or "right", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a system for measuring a vehicle gap or a step, wherein a vehicle body to which a hood, a door, and a trunk lid are assembled is seated on a carrier and moved along parallel transfer lines, and the system is installed over the parallel transfer lines to measure a gap or step between the vehicle body, the hood, the door, and/or the trunk lid, the method comprising the following operations in recited order:

a1) moving and entering the vehicle body seated on the carrier along the parallel transfer lines;

a2) recognizing a vehicle type of the vehicle body entered along the parallel transfer lines based on information transmitted to a controller and information transmitted from an electronic tag to a wireless input/output terminal and eliminating the gap or step with respect to a pre-set portion of the door through a door regulating unit attached to the door;

b) determining whether a measurement position of the gap or step between the vehicle body and the hood, the door, and/or the trunk lid has been checked while a forward/backward moving unit, a horizontal moving unit, a vertical moving unit, and a measurement module are on standby;

c) arranging for operations of the respective moving units and the measurement module according to the checked state of the gap or step measurement position of the vehicle body, measuring the gap or the step between the vehicle body and the hood, the door, and/or the trunk lid, and determining whether the measurement value is identical to a pre-set value inputted to the controller; and d) inputting, by an operator, the gap or step measurement value of the vehicle body to an electronic tag attached to the vehicle body through the wireless input/output terminal, selectively transferring the vehicle body according to the measurement value, and terminating the control.

2. The method of claim 1, wherein the operation a2) comprises:

placing the door having the door regulating unit attached thereto and installed to be freely rotatable in the vehicle body in a reference position as a home position, and eliminating the gap or step with respect to the pre-set portion of the door.

3. The method of claim 1, wherein the operation b) comprises:

setting the respective moving units and the measurement module on standby;

determining by the controller whether the gap or step measurement position between the vehicle body and the hood, the door, and/or the trunk lid has been checked; and when the gap or step measurement position of the vehicle body has not been checked, returning to the setting of the respective moving units and the measurement module on standby.

4. The method of claim 1, wherein the operation c) comprises:

when the checking of the gap or step measurement position of the vehicle body is completed, arranging for the operations of the respective moving units and the measurement module;

moving the respective moving units along the vehicle body according to the gap or step measurement position of the vehicle body to move the measurement module, and measuring the gap or step of the vehicle body through operations of respective rotary motors and a sensor, and comparing the gap or step measurement value between the vehicle body and the hood, the door, and/or the trunk lid measured by the measurement module with the pre-set value inputted to the controller to determine whether the measurement value is identical to the pre set value inputted to the controller.

5. The method of claim 4, wherein the sensor includes a vision sensor and outputs the sensed measurement value to the controller.

6. The method of claim 1, wherein the operation d) comprises:

when the gap or step measurement value between the vehicle body and the hood, the door, and/or the trunk lid measured through the measurement module is not identical to the pre-set value, determining that the vehicle body is defective, inputting, by the operator, the measurement value to the electronic tag through the wireless input/output terminal, transferring the vehicle body as rejected goods, and terminating the control; and when the gap or step measurement value between the vehicle body and the hood, the door, and/or the trunk lid measured through the measurement module is identical to the pre-set value, determining that the vehicle body is qualified, inputting, by the operator, the measurement value to the electronic tag through the wireless input/output terminal, transferring the vehicle body as passed goods, and terminating the control.

* * * * *